United States Patent [19]

Cheever et al.

[11] Patent Number: 5,536,088
[45] Date of Patent: Jul. 16, 1996

[54] FLUID BEARINGS FOR ELECTRONIC SPINDLE MOTORS

[75] Inventors: Charles J. Cheever; Mark Hazelton, both of Beaverton; Frank A. Gray, Portland, all of Oreg.

[73] Assignee: Synektron Corporation, Portland, Oreg.

[21] Appl. No.: 485,373

[22] Filed: Jun. 7, 1995

[51] Int. Cl.⁶ .................................................. F16C 33/74
[52] U.S. Cl. ........................ 384/107; 384/130; 384/132
[58] Field of Search ................................... 384/107, 114, 384/130, 132, 121, 123

[56] References Cited

U.S. PATENT DOCUMENTS

| | | | |
|---|---|---|---|
| 4,445,793 | 5/1984 | Shinohara | 384/130 |
| 4,726,693 | 2/1988 | Anderson et al. | 384/114 |
| 4,795,275 | 1/1989 | Titcomb et al. | 384/107 |
| 5,067,528 | 11/1991 | Titcomb et al. | 141/4 |
| 5,112,142 | 5/1992 | Titcomb et al. | 384/107 |
| 5,328,271 | 7/1994 | Titcomb | 384/610 |
| 5,448,120 | 9/1995 | Schaule et al. | 384/110 |
| 5,488,523 | 1/1996 | Seaver et al. | 384/610 |

*Primary Examiner*—Lenard A. Footland
*Attorney, Agent, or Firm*—Chernoff, Vilhauer, McClung & Stenzel

[57] ABSTRACT

A construction for an electric spindle motor includes a stationary central shaft with a horizontal thrust bearing plate and a rotating hub assembly. A flanged thrust bearing ring having an upper capillary surface is affixed to the hub assembly. An annular end cap having a lower capillary surface is nested within the flanged bearing ring. The upper and lower capillary surfaces are radially outwardly diverging horizontal surfaces relative to each other which define a capillary cavity. Lubricating fluid partially fills the capillary cavity to form a horizontal capillary seal which prevents the fluid from escaping the motor. The capillary seal may be formed by tapering either the upper or lower capillary surfaces to provide an enlargement of the bearing cavity in an axial direction radially outwardly from the central shaft. Alternatively, the capillary seal may be formed by substantially coating the upper and lower capillary surfaces with a barrier coating to increase surface tension. Additional capillary seals may also be included in the invention. Vents, undercuts, and groove patterns may be included to further prevent fluid from escaping the motor.

22 Claims, 5 Drawing Sheets

FLUID BEARINGS FOR ELECTRONIC SPINDLE MOTORS

BACKGROUND OF THE INVENTION

The following invention relates to electronic spindle motors of the type used in disk drives and in particular relates to improvements in fluid bearings for such motors.

Electric spindle motors of the type used in disk drives conventionally rely on ball bearings to support a rotary member, such as a rotating hub, on a stationary member, such as a shaft. Ball bearings are wear parts and in time friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat and noise, both of which are undesirable in a disk drive motor.

Fluid bearings represent a considerable improvement over conventional ball bearings in spindle drive motors. Fluid or "hydrodynamic" bearings are shown in Titcomb, et al., U.S. Pats. Nos. 5,112,142, 4,795,275, and 5,067,528. Other types of fluid bearings are shown in Shinohara U.S. Pat. No. 4,445,793 and Anderson, et al., U.S. Pat. No. 4,726,693.

Of paramount importance in the design of fluid bearings is the integrity of the seal formed by the fluid. If the seal breaks, the fluid runs out of the bearing, rendering the motor inoperative. Seals can be formed by capillary action of the fluid which creates a surface tension seal. Such a seal is shown in the aforementioned Titcomb, et al., U.S..Pat. No. 5,112,142. In the Titcomb patent capillary seals are created by tapering, in the axial direction, one of the two surfaces that defines the capillary gap between rotating and non-rotating parts where the bearing or lubricating fluid is located. Such capillary seals are formed in the radial capillary gaps that separate, for example, a stationary shaft and a rotating sleeve.

A problem unique to fluid bearings is the possible rupturing of the surface tension seal which would allow the bearing fluid to escape. This can be caused by changes in atmospheric pressure that are associated with changes in altitude and other environmental factors. It would therefore be desirable to enhance the integrity of the seal for such fluid bearings without incurring the cost of increasing the size, especially the axial length, of the motor. Obviously the longer the taper that creates the capillary action, the better the integrity of the surface tension seal. However, spindle motors of the type used in disk drives are becoming increasingly smaller with the result that surface area, especially in the axial direction, is at a premium.

SUMMARY OF THE INVENTION

The present invention provides a compact electronic spindle motor design having improvements in seals for fluid bearings without an increase in size. The motor preferably includes a stationary central shaft integral with and perpendicular to a horizontal thrust bearing plate, a rotating hub assembly, and an interior fluid cavity therebetween. Fluid thrust bearings support the rotating hub assembly on the stationary shaft. At least one fluid seal construction is used to keep the fluid bearing within the motor. For example, a horizontal seal construction may be formed in an axial capillary gap or cavity between an upper capillary surface and a lower capillary surface. The horizontal seal construction is formed by lubricating fluid within the axial capillary cavity forming a capillary seal which prevents the fluid from escaping the motor. The invention may include one or more back-up or redundant capillary seals to the horizontal capillary seal. A vertical capillary seal and a redundant vertical capillary seal may also be included in the invention.

A preferred construction for the motor includes a stator assembly including a shaft with a perpendicular thrust bearing plate. A rotating hub assembly, preferably including an outer hub and a rotating sleeve, substantially surrounds the shaft. A flanged bearing ring with an upper capillary surface is joined to the rotating sleeve surrounding the shaft. A stationary annular end cap with a lower capillary surface is fitted about the shaft and is nested within the flanged bearing ring. An horizontal axial capillary cavity is defined between the upper and lower capillary surfaces. Either the flanged bearing ring or the end cap may be tapered at approximately a 2° angle to provide axially outwardly diverging horizontal surfaces relative to each other as the radius becomes larger for creating a capillary seal in the capillary cavity. Alternatively, either the flanged ring or the end cap may be coated with a barrier coating to provide increased surface tension so that the oil resists spreading, thus creating a capillary seal in the bearing cavity. The invention may also include one or more redundant capillary seals which are either perpendicular or parallel to the horizontal capillary cavity.

The lower surface of the end cap or the upper surface of the flanged bearing ring may have a spiral groove pattern to provide an inward pumping action. This maintains a pressure differential, pushing fluid radially inwardly toward the shaft which aids in maintaining the integrity of a capillary seal between the end cap and the flanged bearing ring.

The motor may also include an upwardly extending capillary seal in a vertical axial capillary cavity between the lower portions of the shaft and the rotary sleeve surrounding the shaft. The vertical capillary seal may be created by providing a taper in the capillary cavity or by using a barrier coating similar to the coating of the horizontal capillary seal. The rotary sleeve fits inside an annulus formed by a wall portion of a stator support member. An annular capillary cavity is formed between the outside of the rotary sleeve and the inner diameter of the stator support wall. Either the stator support wall or the rotary sleeve may be tapered or coated with a barrier coating to provide a back-up or redundant vertical capillary seal to the capillary seal formed between the shaft and the rotary sleeve. In this way a redundancy aspect of the invention is built into the motor without a corresponding increase in the amount of surface area needed to create the seal.

In another aspect of the invention, vents may be provided to allow trapped air to vent to the atmosphere outside the motor. These vents prevent constrained air from applying forces to the fluid caused by pressure changes such as altitude variation. Without these vents, fluid subjected to pressure changes may be forced past the capillary seals creating the impression of a "leaking" motor.

In another aspect of the invention, undercuts may be provided as disruptions to further inhibit the flow of lubricating fluid due to centrifugal force.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
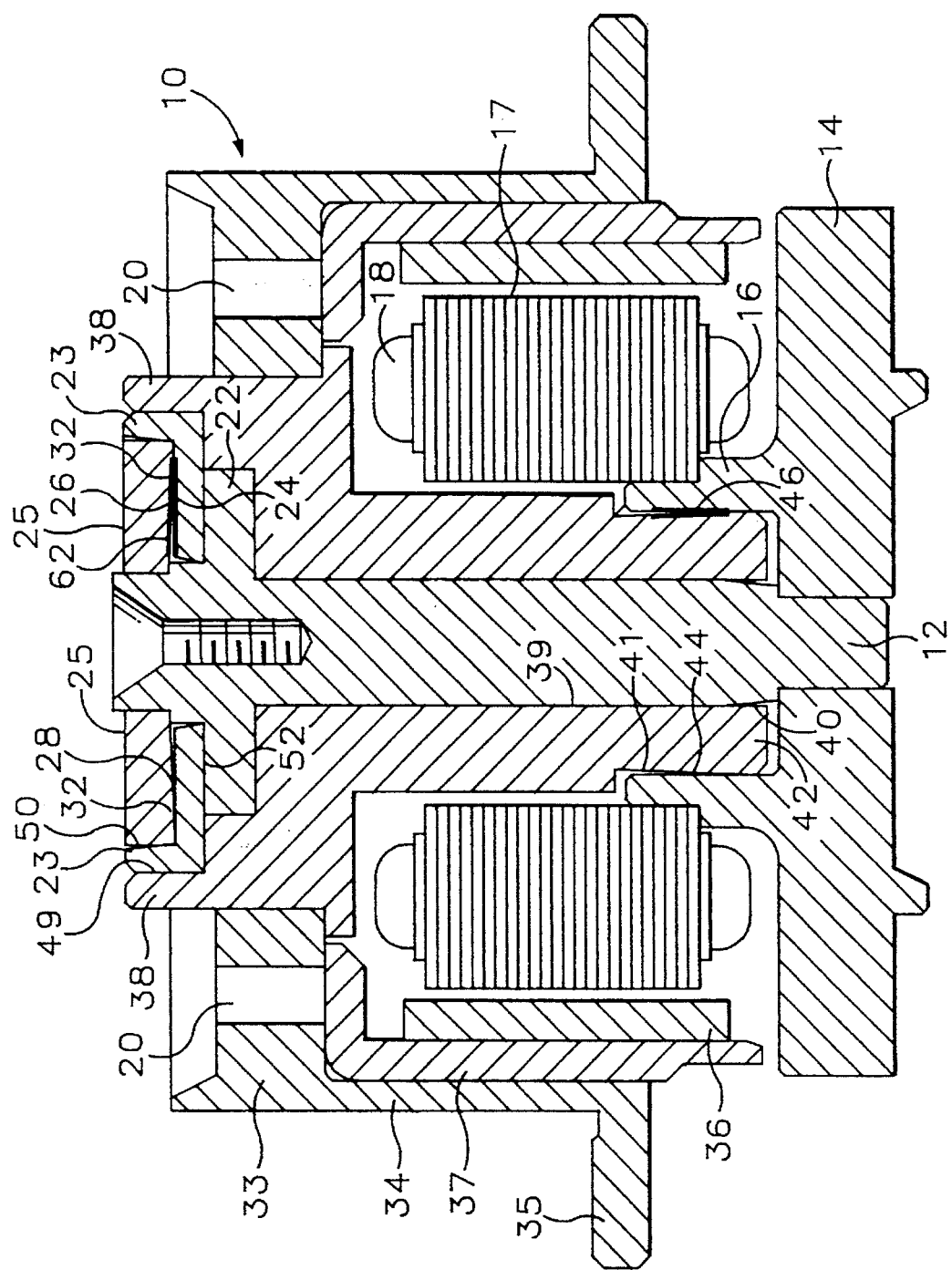
FIG. 1 is a side cutaway view of an electronic spindle motor employing tapered surfaces to form capillary seals of the present invention.
Figure 4:
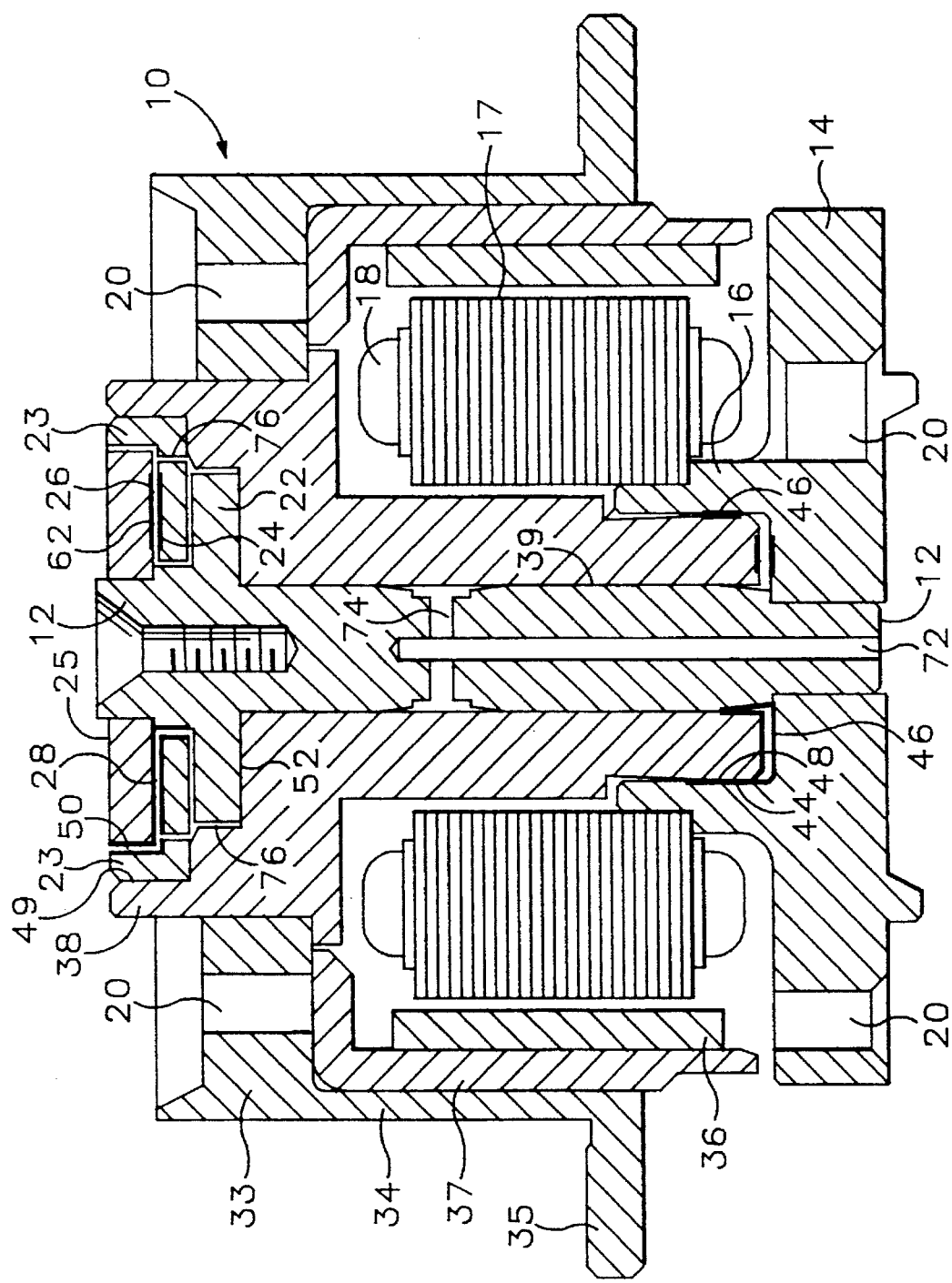
FIG. 4 a side cutaway view of an electronic spindle motor having vents and employing barrier coated surfaces to form capillary seals of the present invention.

As shown in FIGS. 1 and 4, a compact electronic spindle motor 10 preferably includes a stationary central shaft 12 journaled onto a stator support member 14. The support member 14 preferably includes an annular vertical support wall 16 which supports stators 17 and a plurality of stator windings 18. Mounting holes 20 may be provided to bolt the stator support member 14 to a disk drive chassis (not shown). The shaft 12 includes a horizontal thrust bearing plate 22 that provides stability in the axial direction, that is, along the longitudinal axis of the shaft 12.

Figure 2:
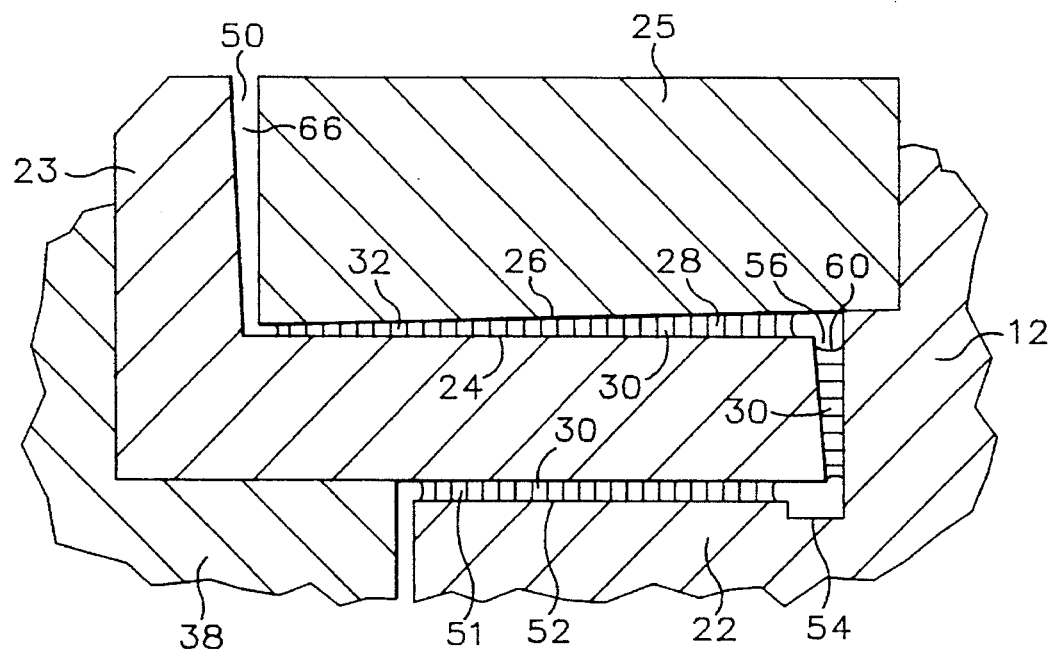
FIG. 2 is a partial closeup cutaway view of horizontal tapered surfaces used to form a capillary seal in the motor of FIG. 1.

As shown in detail in FIGS. 2 and 5, and discussed below in further connection therewith, thrust bearing plate 22 axially supports a rotating thrust bearing ring 23 having an upper capillary surface 24. The thrust bearing ring 23 axially supports an end cap 25 having a lower capillary surface 26. If the capillary gap or cavity 28 between the thrust bearing ring 23 and the end cap 25 becomes at least partially filled with lubricating fluid 30, horizontal capillary seal 32 is formed by surface tension and thereby prevents the fluid 30 from escaping the motor 10.

FIGS. 1 and 4 further show a rotary hub 33 which includes an outer disk support member 34 which has a radial flange 35. The outer disk support member 34 is preferably made of aluminum or other material, and the radial flange 35 supports a rotary magnetic disk (not shown). Magnet members 36 are joined to a bell-shaped backiron insert 37 which is carried within the outer hub member 34.

Joined to the outer hub member 34 is an annular rotary sleeve 38, which encloses the shaft 12. A vertical axial portion of a fluid bearing is formed in the gap or bearing cavity 39 between the inner diameter of sleeve 38 and the outer diameter of shaft 12. Grooves (not shown) may be provided on the shaft 12 or sleeve 38 to generate the appropriate fluid pressure gradient and hydrodynamic pressures to retain the fluid 30 within the bearing cavity 39.

FIG. 1 shows the fluid 30 forming a vertical tapered capillary seal 40 near the bottom of the rotary sleeve 38 which is tapered outward slightly. The seal 40 is at least partially formed by surface tension caused by the tapering and resists the normal tendency of the fluid 30 to flow out of the bearing cavity 39. Details as to the formation of such seals are shown for example in pending U.S. patent application Ser. No. 08/226,310 entitled "FLUID BEARING WITH ASYMMETRICAL GROOVE PATTERN" which is assigned to the same assignee as the present application, the disclosure of which is hereby incorporated by reference.

Figure 3:
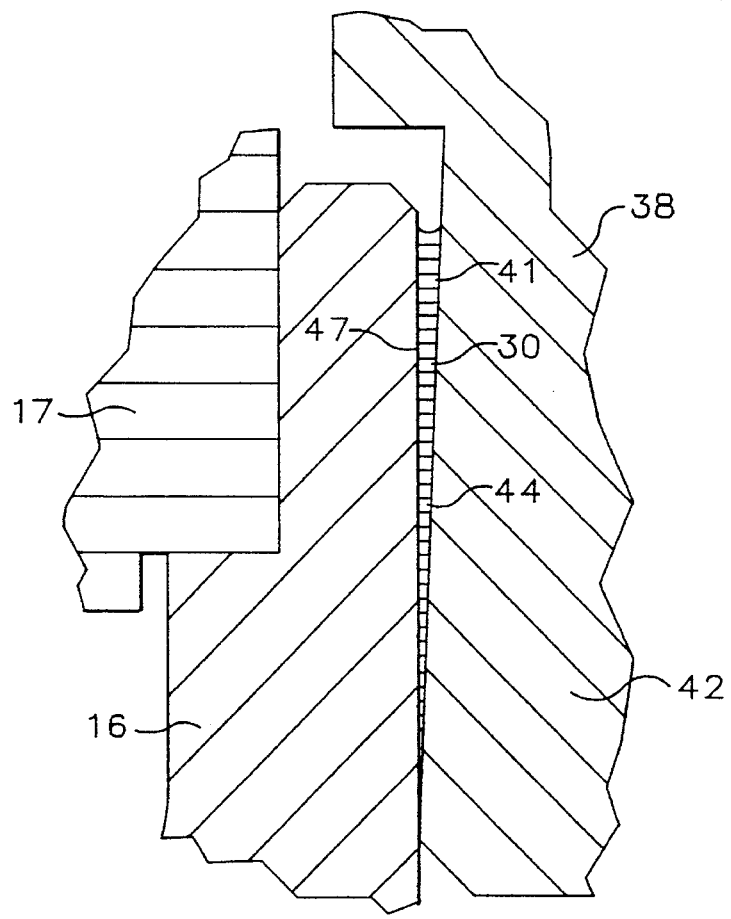
FIG. 3 is a partial closeup cutaway view of a redundant vertical capillary seal in the motor of FIG. 1.

FIGS. 1 and 3 show a redundant vertical tapered capillary seal 41. A cylindrical lower portion 42 of the sleeve 38 has a reduced outer diameter or otherwise fits within an annulus 44 formed by an inner surface 46 of the vertical wall portion 16 of the stator support member 14. The inner surface 46 of the vertical wall portion 16 is tapered outward slightly so that the surface tension causes the fluid 30 to form a capillary seal 41 in this region in the event of a breakdown of the seal 40. FIG. 3 shows the condition wherein the seal 40 has ruptured and a redundant seal 41 has formed in the annulus 44. FIG. 4 shows annulus 44 coated with a barrier coating 46 to further increase surface tension used to create a redundant vertical capillary seal 48. Using barrier coating 46, annulus 44 could be parallel to the lower portion 42 of sleeve 38 as shown in FIG. 4.

As discussed above and shown in detail in FIGS. 2 and 5, the upwardly flanged thrust bearing ring 23 fits inside of a recess 49 in the rotary sleeve 38. The flanged bearing ring 23 in turn provides a recess 50 for end cap 25. When motor 10 is initially shipped, fluid 30 forms a fluid bearing 51 in gap 52 between the thrust bearing plate 22 and bearing ring 23. An undercut 54 may be provided at the outer end of bearing 51 to act as a disruption to inhibit the flow of fluid 30. Ideally, fluid 30 would not pass this bearing 51, however, the present invention is designed to prevent fluid 30 which passes this point from escaping the motor 10.

Fluid 30 passing undercut 54 may enter a first vertical capillary cavity 56 defined by thrust bearing ring 23 and shaft 12. First vertical capillary cavity 56 may be tapered, as shown in FIG. 2 and/or coated (on either or both surfaces) with a barrier coating 58 as shown in FIG. 5. Surface tension created by the tapering or coating causes fluid 30 to form a first vertical capillary seal 60 in first vertical capillary cavity 56.

Fluid 30 passing first vertical capillary cavity 56 (such as when first vertical capillary seal 60 breaks) may enter horizontal capillary cavity 28. Horizontal capillary cavity 28 may be tapered, as shown in FIG. 2 and/or coated with a barrier coating 62 on either or both upper and lower surfaces 24 and 26. Surface tension created by the tapering or coating within horizontal capillary cavity 28 causes the formation of horizontal capillary seal 32 in horizontal capillary cavity 28. The capillary seal 32 provides an efficient and compact sealing mechanism that makes use of available surface area and does not increase the axial length of the motor 10.

Figure 5:
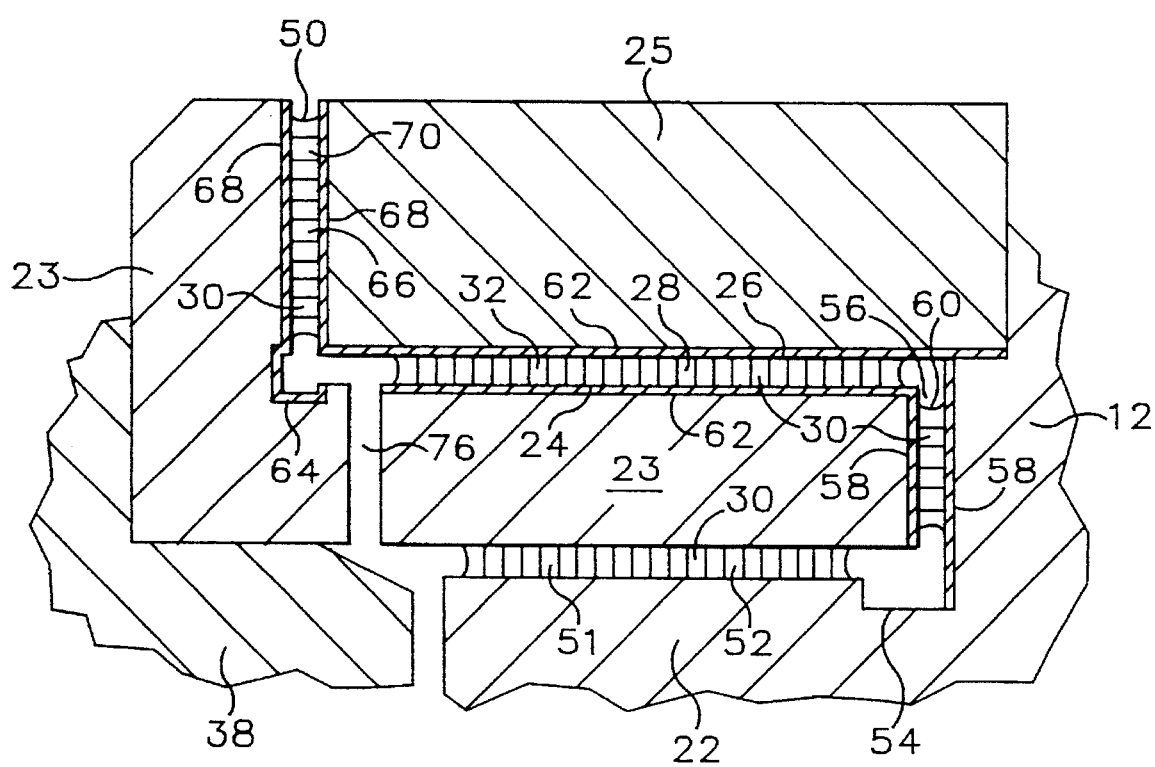
FIG. 5 is a partial closeup cutaway view of horizontal barrier coated surfaces used to form a horizontal capillary seal and perpendicular redundant capillary seals in the motor of FIG. 4.

As shown in FIG. 5, an additional undercut 64 may be provided after horizontal capillary cavity 28 to act as a further disruption to inhibit the flow of fluid 30. As shown, undercut 64 is a dual undercut, however it is understood that it could be a single undercut similar to undercut 54. The purpose of this particular undercut disruption 64 is to inhibit the flow of fluid 30 due to centrifugal force if the fluid 30 gets past horizontal capillary cavity 28. This undercut 64 is preferably located approximately at the intersection between the horizontal and vertical portions of the upwardly flanged thrust bearing ring 23.

Fluid 30 passing undercut 64 may enter a second vertical capillary cavity 66 defined by thrust bearing ring 23 and end cap 25. Second vertical capillary cavity 66 may be tapered, as shown in FIG. 2 and/or coated with a barrier coating 68 as shown in FIG. 5. Surface tension created by the tapering or coating causes fluid 30 to form a second vertical capillary seal 70 (shown in FIG. 5) in second vertical capillary cavity 66.

FIGS. 4 and 5 further show the use of vents in a motor 10 which allow air trapped within the motor 10 to be vented. This venting prevents the air from being constrained and applying forces on the fluid 30 when the motor 10 is subjected to pressure changes associated with altitude variations. If the motor 10 is not vented, as the altitude changes, trapped air expands and therefore pushes the fluid 30 past the capillary seals thus creating a "leaking" problem. It should be noted that venting may be used in any of the above described embodiments of the invention. Further, venting would not be needed if the motor 10 was to be used where it would not be subjected to pressure changes.

FIG. 4 shows a shaft vent 72 longitudinally bored part way through shaft 12. Perpendicular to and intersecting with shaft vent 72, a cross vent 74 is drilled through shaft 12. Cross vent 74 provides venting to opposite sides of the axial bearing cavity 39 between the inner diameter of sleeve 38 and the outer diameter of shaft 12.

Figure 7:
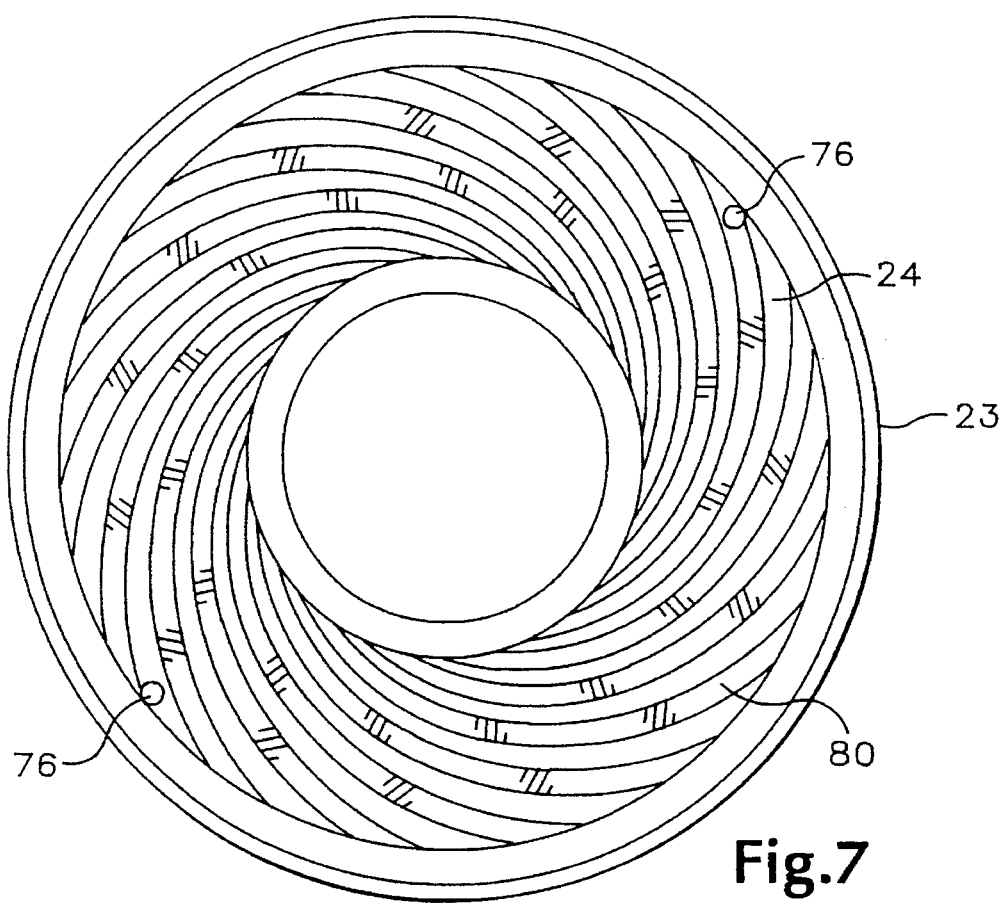
FIG. 7 is a top view of an upwardly flanged thrust bearing ring for the spindle motor showing a spiral groove pattern.

FIGS. 4, 5, and 7 show thrust bearing vents 76 for venting gaps surrounding the bearing ring 23 and the end cap 25. Although any number of vents could be used, the preferred embodiment includes two vents 76, each .010 inch in diameter, which are drilled through the bearing ring 23 at a radius which is slightly greater than the outer diameter of the thrust bearing plate 22. Preferably, the two vents 76 are drilled 180° apart for balance. The placement of vents 76 allows for the venting of the gaps without directly exposing the vents 76 to outside atmosphere and risking the potential for contaminants to enter the gaps. Additionally, vents 76 act as a disruption to inhibit the outward movement of the fluid 30.

Figure 6:
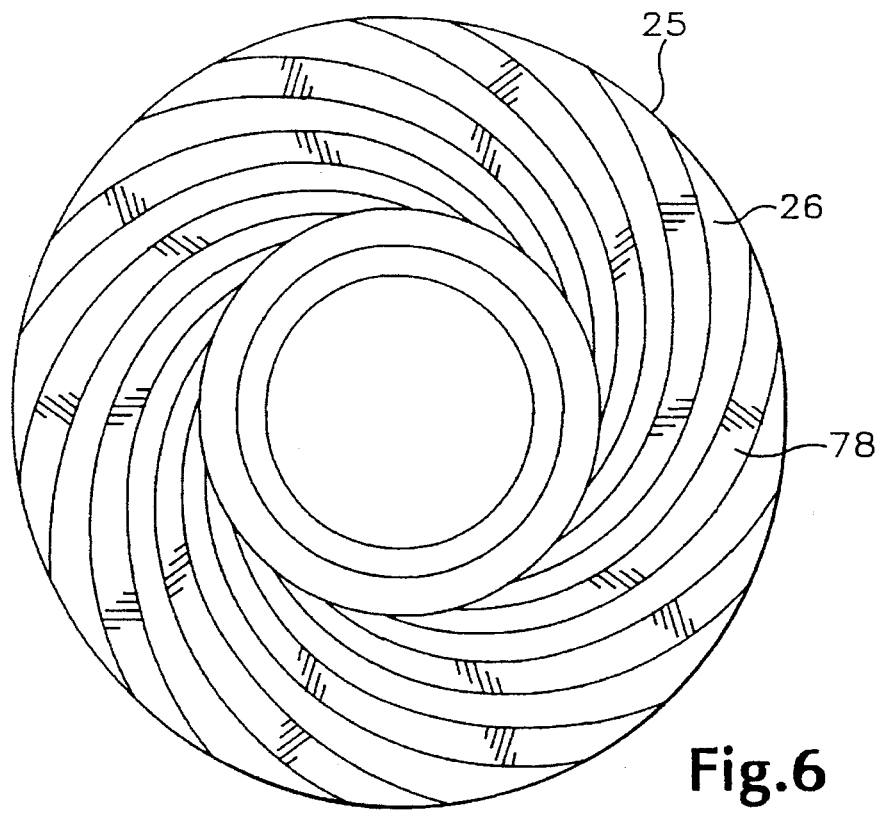
FIG. 6 is a bottom view of an end cap for the spindle motor showing a spiral groove pattern.

Referring to FIG. 6, the end cap 25 has a bottom surface 26 which may include a spiral groove pattern 78. Alternatively, as shown in FIG. 7, the upper capillary surface 24 of the flanged bearing ring 23 may include a spiral groove pattern 80. When the thrust bearing ring 23 rotates in conjunction with the hub 33, a groove pattern (78 or 80) provides an inward pumping action for fluid 30 retained in axial capillary cavity 28. This provides an additional means of assuring the integrity of the capillary seal. 32 because the resulting pressure gradient is directed in a radially inwardly direction toward the center of the shaft 12.

It should be noted that the barrier coatings 46, 58, 62, and 68 may be any durable film of low surface energy which retards the migration or spread of bearing fluids 30. The barrier coating may be, for example, isosteric acid or a fluorocarbon polymer such as Nyebar. Further, both FIGS. 1 and 4 show cross-sections of exemplary motors. However, the barrier coatings may be applied as shown either on the left or right sides of either figure. An actual motor 10 would have (or not have) barrier coatings that are applied symmetrically about the central shaft 12.

The tapered surfaces described above are preferably tapered at approximately 2° to create axially diverging surfaces so that fluid 30 is retained by surface tension. Either or both surfaces of the gaps 28, 39, 44, 52, 56, and 66 may be tapered. The surfaces may be tapered by machining such as milling, drilling, turning or other methods. Tapered surfaces may also be coated with a barrier coating as shown on the left side of FIG. 1.

Finally, it should be noted that the invention may be adapted to work with alternate spindle motors such as those having a rotating shaft.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fluid seal construction for a spindle motor having a stationary central shaft with a horizontal thrust bearing plate, a rotating hub assembly, and an interior fluid cavity, said seal construction comprising:

(a) a rotating thrust bearing ring having a upper capillary surface, said thrust bearing ring axially adjacent said thrust bearing plate;

(b) an end cap having a lower capillary surface, said end cap axially adjacent said thrust bearing ring; and (c) a horizontal capillary seal formed by lubricating fluid which at least partially fills a capillary cavity defined by said upper and lower capillary surfaces;

(d) wherein said capillary seal prevents said fluid from escaping said motor.

2. The fluid seal construction of claim 1 wherein at least one of said upper and lower capillary surfaces is coated with a barrier coating to increase surface tension.

3. The fluid seal construction of claim 2 wherein said barrier coating has a low surface energy which retards the migration of said fluid.

4. The fluid seal construction of claim 1 wherein at least one of said upper and lower capillary surfaces is tapered to provide a widening taper of said cavity in an axial direction radially outward from said shaft.

5. The fluid seal construction of claim 4 wherein said at least one of said upper and lower capillary surfaces is machined to provide said widening taper.

6. The fluid seal construction of claim 4 wherein said at least one of said upper and lower capillary surfaces is tapered at about 2°.

7. The fluid seal construction of claim 4 wherein at least one of said upper and lower capillary surfaces is coated with a barrier coating.

8. The fluid seal construction of claim 1 wherein said shaft, said thrust bearing ring, and said end cap define a fluid labyrinth for said fluid.

9. The fluid seal construction of claim 8 wherein said fluid labyrinth is coated with a barrier coating.

10. The fluid seal construction of claim 1 wherein said thrust bearing ring includes an axially upward extending flange creating a recess and said end cap nests within said recess, said thrust bearing ring having an axial undercut between said upper capillary surface and said axially upward extending flange.

11. The fluid seal construction of claim 1 wherein said lower capillary surface has an inwardly directed spiral groove pattern.

12. The fluid seal construction of claim 1 wherein said upper capillary surface has an inwardly directed spiral groove pattern.

13. The fluid seal construction of claim 1 wherein the thrust bearing ring defines at least one thrust bearing vent which extends from the upper capillary surface to a lower surface of the thrust bearing ring.

14. The fluid seal construction of claim 13 wherein the at least one thrust bearing vent is two thrust bearing vents.

15. The fluid seal construction of claim 1 wherein the thrust bearing ring fits within a recess of a rotary sleeve of said hub assembly, said rotary sleeve at least partially surrounding said central shaft.

16. The fluid seal construction of claim 1 further comprising:

(a) a rotary sleeve of said hub assembly at least partially surrounding said central shaft, said rotary sleeve having a lower portion surrounding a lower portion of said central shaft;

(b) an axial capillary cavity defined by an inner diameter of said lower portion of said rotary sleeve and an outer diameter of said lower portion of said central shaft; and (c) an axial capillary seal formed from fluid which at least partially fills said axial capillary cavity at a lower axial diameter of said vertical axial capillary cavity;

(d) wherein said axial capillary seal prevents said fluid from escaping said motor.

17. The fluid seal construction of claim 16 wherein said central shaft is journaled onto a stator support member having an annular vertical support wall, said seal construction further comprising:

(a) a redundant axial capillary cavity defined by an inner diameter of said annular vertical support wall and an outer diameter of said lower portion of said rotary sleeve;

(b) a redundant axial capillary seal formed from fluid which at least partially fills said redundant axial capillary cavity at an upper axial diameter of said redundant axial capillary cavity; and (c) said redundant axial capillary seal prevents said fluid from escaping said motor.

18. The fluid seal construction of claim 17 wherein at least one of the inner diameter of said annular vertical support wall and the outer diameter of said lower portion of said rotary sleeve is coated with a barrier coating.

19. The fluid seal construction of claim 17 wherein at least one of the inner diameter of said annular vertical support wall and the outer diameter of said lower portion of said rotary sleeve is tapered to provide a gradual widening of the upper axial diameter of said redundant axial capillary cavity.

20. The fluid seal construction of claim 17 further comprising:

(a) a shaft vent extending longitudinally through the lower portion of said central shaft; and (b) a cross vent perpendicular to and intersecting with said shaft vent;

(c) wherein said cross vent provides venting to opposite sides of the axial capillary cavity.

21. A fluid seal construction for a spindle motor having a stationary central shaft with a horizontal thrust bearing plate, a hub assembly, and an interior fluid cavity, said central shaft journaled onto a stator support member having an annular vertical support wall, said seal construction comprising:

(a) a rotary sleeve of said hub assembly at least partially surrounding said central shaft, said rotary sleeve having a lower portion surrounding a lower portion of said central shaft;

(b) an axial capillary cavity defined by an inner diameter of said lower portion of said rotary sleeve and an outer diameter of said lower portion of said central shaft;

(c) an axial capillary seal formed from fluid which at least partially fills said axial capillary cavity;

(d) a redundant axial capillary cavity defined by an inner diameter of said annular vertical support wall and an outer diameter of said lower portion of said rotary sleeve; and (e) a redundant axial capillary seal formed from fluid which at least partially fills said redundant axial capillary cavity;

(f) wherein said axial capillary seal and said redundant axial capillary seal prevent said fluid from escaping said motor.

22. A fluid seal construction for a spindle motor having a stationary central shaft with a horizontal thrust bearing plate, and a rotating hub assembly, said seal construction comprising:

(a) a rotating thrust bearing ring axially adjacent said thrust bearing plate and surrounding said central shaft, said thrust bearing ring having an upward flange;

(b) an end cap axially adjacent said thrust bearing ring and surrounding said central shaft;

(c) a horizontal thrust bearing formed by fluid which at least partially fills a bearing cavity defined by an upper surface of said horizontal thrust bearing plate and a lower surface of said thrust bearing ring;

(d) a first vertical capillary cavity defined by said thrust bearing ring and said central shaft;

(e) a horizontal capillary cavity defined by an upper surface of said horizontal thrust bearing ring and a lower surface of said end cap;

(f) a second vertical capillary cavity defined by the upward flange of said thrust bearing ring and said end cap; and (g) at least one capillary seal formed by said fluid within at least one of said capillary cavities, said at least one capillary seal inhibiting flow of said fluid.

\* \* \* \* \*

UNITED STATES PATENT AND TRADEMARK OFFICE
CERTIFICATE OF CORRECTION

PATENT NO. : 5,536,088
DATED : July 16, 1996
INVENTOR(S) : Charles J. Cheever et al.

It is certified that error appears in the above-identified patent and that said Letters Patent is hereby corrected as shown below:

Col. 2, Line 13  Delete "An" and insert --A--.

Col. 5, Line 22  Delete "each. 010" and insert --each .010--;

Col. 6, Line 10  After "having" delete "a" and insert --an--;

Line 14  Delete "and";

Line 17  After "surfaces" insert --and--.

Col. 7, Line 7  Delete "and";

Line 10  After "cavity;" insert --and--;

Line 40  Delete "and";

Line 42  After "vent" insert --and--.

UNITED STATES PATENT AND TRADEMARK OFFICE
CERTIFICATE OF CORRECTION

PATENT NO. : 5,536,088
DATED : July 16, 1996
INVENTOR(S) : Charles J. Cheever et al.

It is certified that error appears in the above-indentified patent and that said Letters Patent is hereby corrected as shown below:

Col. 8, Line 14  Delete "and";
       Line 17  After "cavity" insert --and--.

Signed and Sealed this

Eleventh Day of February, 1997

Attest:

BRUCE LEHMAN

Attesting Officer     Commissioner of Patents and Trademarks